(12) United States Patent
Zhou et al.

(10) Patent No.: US 12,244,232 B2
(45) Date of Patent: Mar. 4, 2025

(54) BIDIRECTIONAL DC CONVERTER, CONTROL METHOD THEREFOR, AND CONTROL MODULE THEREOF, AND STORAGE MEDIUM

(71) Applicant: ZTE Corporation, Shenzhen (CN)

(72) Inventors: Jianping Zhou, Shenzhen (CN); Qia Wang, Shenzhen (CN); Mingming Liu, Shenzhen (CN); Guoxian Lin, Shenzhen (CN); Ben E, Shenzhen (CN); Yulong Cui, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 293 days.

(21) Appl. No.: 18/013,497

(22) PCT Filed: Jun. 28, 2021

(86) PCT No.: PCT/CN2021/102783
§ 371 (c)(1),
(2) Date: Dec. 28, 2022

(87) PCT Pub. No.: WO2022/001966
PCT Pub. Date: Jan. 6, 2022

(65) Prior Publication Data
US 2023/0344353 A1    Oct. 26, 2023

(30) Foreign Application Priority Data

Jun. 29, 2020  (CN) .......................... 202010605231.0

(51) Int. Cl.
*H02M 3/158* (2006.01)
*H02M 1/08* (2006.01)

(52) U.S. Cl.
CPC ........... *H02M 3/1586* (2021.05); *H02M 1/08* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 8,035,061 B2 * 10/2011 Jung .................... A45D 1/14
132/223
10,177,661 B2 * 1/2019 Ye ...................... H02M 3/1582
(Continued)

FOREIGN PATENT DOCUMENTS

CN    101499717 A    8/2009
CN    104821715 A    8/2015
(Continued)

OTHER PUBLICATIONS

International Search Report and Written Opinion for International Application No. PCT/CN2021/102783 mailed Sep. 24, 2021.
(Continued)

*Primary Examiner* — Sean Kayes
*Assistant Examiner* — Nusrat Quddus
(74) *Attorney, Agent, or Firm* — Wolf, Greenfield & Sacks, P.C.

(57) ABSTRACT

Disclosed are a control method for a bidirectional DC converter, a control module for a bidirectional DC converter, a bidirectional DC converter, and a non-transitory computer-readable storage medium. The control method includes: determining an operating mode of the bidirectional DC converter according to an input voltage and an output voltage; respectively determining a duty cycle of a drive signal of the first switch transistor, a duty cycle of a drive signal of the second switch transistor, a duty cycle of a drive signal of the third switch transistor, and a duty cycle of a drive signal of the fourth switch transistor according to the operating mode of the bidirectional DC converter; and
(Continued)

providing drive signals to gates of the first switch transistor, the second switch transistor, the third switch transistor and the fourth switch transistor respectively.

15 Claims, 5 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/07; H02M 3/073; H02M 2003/071; H02M 2003/072; H02M 2003/075; H02M 2003/076; H02M 2003/077; H02M 2003/078; H02M 2001/0048; H05B 39/048; B23K 11/24; H04B 2215/069; H02J 3/46; H02J 3/38
See application file for complete search history.

(56) References Cited

U.S. PATENT DOCUMENTS

| | | |
|---|---|---|
| 2006/0284606 A1 | 12/2006 | Chen et al. |
| 2010/0019745 A1 | 1/2010 | Keskar et al. |
| 2010/0019753 A1* | 1/2010 | Ikeda ................. H02M 3/158 323/311 |
| 2012/0049816 A1 | 3/2012 | Hester |
| 2013/0320949 A1 | 12/2013 | Prexl et al. |
| 2015/0367735 A1 | 12/2015 | Baker et al. |
| 2018/0123341 A1* | 5/2018 | Lehn ................. H02M 1/15 |
| 2018/0287498 A1* | 10/2018 | Yu ................. H02M 3/1582 |
| 2020/0076304 A1 | 3/2020 | Oyama |
| 2021/0194356 A1* | 6/2021 | Afridi ................. H02J 9/062 |

FOREIGN PATENT DOCUMENTS

| | | |
|---|---|---|
| CN | 109889047 A | 6/2019 |
| JP | 2009-268255 A | 11/2009 |
| WO | WO 2018/116699 A1 | 6/2018 |

OTHER PUBLICATIONS

Chen et al., Research on High Efficient DC-DC Converter of Buck-Boost. Journal of Liaoning University of Technology (Natural Science Edition). Dec. 31, 2016;36(6). 5 pages.
Extended European Search Report for European Application No. 21833767.3, dated Oct. 31, 2023.
Office Action for Japanese Application No. 2022-581495, mailed Dec. 12, 2023.
Search Report for Japanese Application No. 2022-581495, mailed Dec. 13, 2023.
Huang et al., High efficiency buck-boost converter with reduced average inductor current (RAIC) technique. 2009 Proceedings of ESSCIRC. Sep. 14, 2009:456-9.
Zhang et al., Systematic derivation of dead-zone elimination strategies for the noninverting synchronous buck-boost converter. IEEE Transactions on Power Electronics. May 16, 2017;33(4):3497-508.

* cited by examiner

BIDIRECTIONAL DC CONVERTER, CONTROL METHOD THEREFOR, AND CONTROL MODULE THEREOF, AND STORAGE MEDIUM

CROSS-REFERENCE TO RELATED APPLICATION

This application is a national stage filing under 35 U.S.C. § 371 of international application number PCT/CN2021/102783, filed Jun. 28, 2021, which claims priority to Chinese patent application No. 202010605231.0, filed Jun. 29, 2020. The contents of these applications are incorporated herein by reference in their entirety.

TECHNICAL FIELD

The present disclosure relates to the field of electronic device, and more particularly, to a control method for a bidirectional DC converter, a control module for a bidirectional DC converter, a bidirectional DC converter, and a non-transitory computer-readable storage medium.

BACKGROUND

A DC/DC converter is a power apparatus that converts a DC voltage to another DC voltage. In addition to converting a DC voltage to another DC voltage, a bidirectional DC converter can also implement bidirectional flow of energy between an input side and an output side of the bidirectional DC converter.

Figure 1:
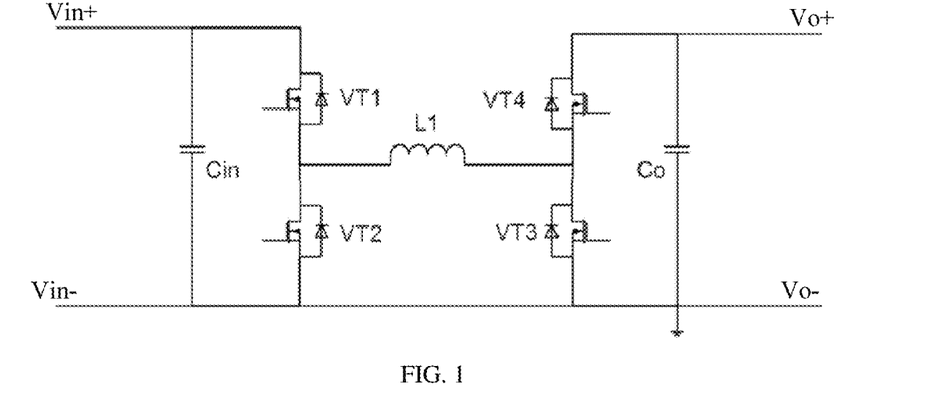
FIG. 1 is a schematic circuit diagram of a bidirectional DC converter in some cases in the art.

FIG. 1 is a common four-switch bidirectional DC converter, in particular, the four-switch bidirectional DC converter includes a first bridge arm, a second bridge arm, and an inductor L1 connected between the first bridge arm and the second bridge arm.

The first bridge arm includes a first switch transistor VT1 and a second switch transistor VT2, where a first electrode of the first switch transistor VT1 is electrically connected to a positive electrode of an input terminal of the bidirectional DC converter, a second electrode of the first switch transistor VT1 is electrically connected to a first electrode of the second switch transistor VT2, and a second electrode of the second switch transistor VT2 is electrically connected to a negative electrode of the input terminal of the bidirectional DC converter. The second bridge arm includes a third switch transistor VT3 and a fourth switch transistor VT4. A first electrode of the third switch transistor VT3 is electrically connected to a negative electrode of an output terminal of the bidirectional DC converter, a second electrode of the third switch transistor VT3 is electrically connected to a first electrode of the fourth switch transistor VT4, and a second electrode of the fourth switch transistor VT4 is electrically connected to a positive electrode of the output terminal of the bidirectional DC converter.

A first terminal of the inductor L1 is electrically connected to the first electrode of the first switch transistor VT1, and a second terminal of the inductor L1 is electrically connected to the first electrode of the fourth switch transistor VT4.

Operating modes of the bidirectional DC converter include a Buck mode, a Boost mode, and a Buck/Boost mode.

In the Buck mode, the first bridge arm operates, the first switch transistor VT1 and the second switch transistor VT2 are alternately turned on, the third switch transistor VT3 in the second bridge arm is normally turned off, and the fourth switch transistor VT4 in the second bridge arm is normally turned on.

In the Buck/Boost mode, the first bridge arm and the second bridge arm operate simultaneously, the first switch transistor VT1 and the third switch transistor VT3 are synchronously turned on/off, and the second switch transistor VT2 and the fourth switch transistor VT4 are synchronously turned on/off. The first switch transistor VT1 and the second switch transistor VT2 are alternately turned on/off, and the third switch transistor VT3 and the fourth switch transistor VT4 are alternately turned on/off.

In the Boost mode, the second bridge arm operates, the third switch transistor VT3 and the fourth switch transistor VT4 are alternately turned on, the first switch transistor VT1 in the first bridge arm is normally turned on, and the second switch transistor VT2 is normally turned off.

In the above three operating modes, especially in the transition from the Buck mode to the Buck/Boost mode or from the Buck/Boost mode to the Boost mode, some of the existing control methods may have a problem of voltage offset.

SUMMARY

An objective of the present disclosure is to provide a control method for a bidirectional DC converter, a control module for a bidirectional DC converter, a bidirectional DC converter, and a non-transitory computer-readable storage medium.

In accordance with an aspect of the present disclosure, a control method for a bidirectional DC converter is provided. The bidirectional DC converter includes at least one power conversion unit, which includes a first bridge arm, a second bridge arm, and an inductor, where the first bridge arm includes a first switch transistor and a second switch transistor. A first electrode of the first switch transistor is electrically connected to a positive electrode of an input terminal of the bidirectional DC converter, a second electrode of the first switch transistor is electrically connected to a first electrode of the second switch transistor, and a second electrode of the second switch transistor is electrically connected to a negative electrode of the input terminal of the bidirectional DC converter. The second bridge arm includes a third switch transistor and a fourth switch transistor, where a first electrode of the third switch transistor is electrically connected to a negative electrode of an output terminal of the bidirectional DC converter, a second electrode of the third switch transistor is electrically connected to a first electrode of the fourth switch transistor, and a second electrode of the fourth switch transistor is electrically connected to a positive electrode of the output terminal of the bidirectional DC converter. A first terminal of the inductor is electrically connected to the second electrode of the first switch transistor, and a second terminal of the inductor is electrically connected to the first electrode of the fourth switch transistor. The control method includes: determining an operating mode of the bidirectional DC converter according to an input voltage and an output voltage; respectively determining a duty cycle of a drive signal of the first switch transistor, a duty cycle of a drive signal of the second switch transistor, a duty cycle of a drive signal of the third switch transistor, and a duty cycle of a drive signal of the fourth switch transistor according to the operating mode of the bidirectional DC converter; and providing the drive signal to a gate of the first switch transistor according to the determined duty cycle of the drive signal of the first switch transistor, providing the drive signal to a gate of the second switch transistor according to the determined duty cycle of the drive signal of the second switch transistor, providing the drive signal to a gate of the third switch transistor according to the determined duty cycle of the drive signal of the third switch transistor, and providing the drive signal to a gate of the fourth switch transistor according to the determined duty cycle of the drive signal of the fourth switch transistor; wherein the duty cycle of the drive signal of the first switch transistor, the duty cycle of the drive signal of the second switch transistor, the duty cycle of the drive signal of the third switch transistor, and the duty cycle of the drive signal of the fourth switch transistor between the operating mode of the bidirectional DC converter satisfy a following relationship. In response to the bidirectional DC converter operating in a Buck mode, a maximum value of the duty cycle of the drive signal of the first switch transistor is a first duty cycle threshold; in response to the bidirectional DC converter operating in a Boost mode, a minimum value of the duty cycle of the drive signal of the third switch transistor is a second duty cycle threshold; and in response to the bidirectional DC converter operating in a Buck/Boost mode, the duty cycle of the drive signal of the first switch transistor is a constant value. A differential between the first duty cycle threshold and the constant value does not exceed a predetermined differential, and the duty cycle of the drive signal of the third switch transistor satisfies: $1-D_{11}/K1<D_2<1-D_{11}/K2$, where $D_{11}$ represents the constant value; K1 represents a Buck coefficient of the bidirectional DC converter, $0.9 \leq K1<1$; and K2 represents a Boost coefficient of the bidirectional DC converter, $1<K2<1.1$.

In accordance with an aspect of the present disclosure, a control module for a bidirectional DC converter is provided. The bidirectional DC converter includes at least one power conversion unit, and the power conversion unit includes a first bridge arm, a second bridge arm and an inductor, where the first bridge arm includes a first switch transistor and a second switch transistor. A first electrode of the first switch transistor is electrically connected to a positive electrode of an input terminal of the bidirectional DC converter, a second electrode of the first switch transistor is electrically connected to a first electrode of the second switch transistor, and a second electrode of the second switch transistor is electrically connected to a negative electrode of the input terminal of the bidirectional DC converter. The second bridge arm includes a third switch transistor and a fourth switch transistor, where a first electrode of the third switch transistor is electrically connected to a negative electrode of an output terminal of the bidirectional DC converter, a second electrode of the third switch transistor is electrically connected to a first electrode of the fourth switch transistor, and a second electrode of the fourth switch transistor is electrically connected to the positive electrode of the output terminal of the bidirectional DC converter. A first terminal of the inductor is electrically connected to the second electrode of the first switch transistor, and a second terminal of the inductor is electrically connected to the first electrode of the fourth switch transistor. The control module includes a signal processing unit and a drive unit. The signal processing unit is configured to determine an operating mode of the bidirectional DC converter according to an input voltage and an output voltage, and respectively determine a duty cycle of a drive signal of the first switch transistor, a duty cycle of a drive signal of the second switch transistor, a duty cycle of a drive signal of the third switch transistor, and a duty cycle of a drive signal of the fourth switch transistor according to the operating mode of the bidirectional DC converter. The duty cycle of the drive signal of the first switch transistor, the duty cycle of the drive signal of the second switch transistor, the duty cycle of the drive signal of the third switch transistor, and the duty cycle of the drive signal of the fourth switch transistor between the operating mode of the bidirectional DC converter satisfy a following relationship. In response to the bidirectional DC converter operating in a Buck mode, a maximum value of the duty cycle of the drive signal of the first switch transistor is a first duty cycle threshold; in response to the bidirectional DC converter operating in a Boost mode, a minimum value of the duty cycle of the drive signal of the third switch transistor is a second duty cycle threshold; and in response to the bidirectional DC converter operating in a Buck/Boost mode, the duty cycle of the drive signal of the first switch transistor is a constant value, a differential between the first duty cycle threshold and the constant value does not exceed a predetermined differential, and the duty cycle of the drive signal of the third switch transistor satisfies: $1-D_{11}/K1<D_{2<1}-D_{11}/K2$, where $D_{11}$ represents the constant value; K1 represents a Buck coefficient of the bidirectional DC converter, $0.9 \leq K1<1$; and K2 represents a Boost coefficient of the bidirectional DC converter, $1<K2<1.1$. The drive unit has at least one output terminal group, and each output terminal group includes a first output terminal electrically connected to a gate of the first switch transistor, a second output terminal electrically connected to a gate of the second switch transistor, a third output terminal electrically connected to a gate of the third switch transistor, and a fourth output terminal electrically connected to a gate of the fourth switch transistor. The drive unit is configured to output the drive signal of the first switch transistor from the first output terminal according to the duty cycle of the drive signal of the first switch transistor, output the drive signal of the second switch transistor from the second output terminal according to the duty cycle of the drive signal of the second switch transistor, output the drive signal of the third switch transistor from the third output terminal according to the duty cycle of the drive signal of the third switch transistor, and output the drive signal of the fourth switch transistor from the fourth output terminal according to the duty cycle of the drive signal of the fourth switch transistor.

In accordance with an aspect of the present disclosure, there is provided a bidirectional DC converter, which includes at least one power conversion unit, and the control module described above. The power conversion unit includes a first bridge arm, a second bridge arm and an inductor, where the first bridge arm includes a first switch transistor and a second switch transistor. A first electrode of the first switch transistor is electrically connected to a positive electrode of an input terminal of the bidirectional DC converter, a second electrode of the first switch transistor is electrically connected to a first electrode of the second switch transistor, and a second electrode of the second switch transistor is electrically connected to a negative electrode of the input terminal of the bidirectional DC converter. The second bridge arm includes a third switch transistor and a fourth switch transistor, where a first electrode of the third switch transistor is electrically connected to a negative electrode of an output terminal of the bidirectional DC converter, a second electrode of the third switch transistor is electrically connected to a first electrode of the fourth switch transistor, and a second electrode of the fourth switch transistor is electrically connected to the positive electrode of the output terminal of the bidirectional DC converter. A first terminal of the inductor is electrically connected to the second electrode of the first switch transistor, and a second terminal of the inductor is electrically connected to the first electrode of the fourth switch transistor.

In accordance with an aspect of the present disclosure, there is provided a non-transitory computer-readable storage medium having an executable program stored thereon which, when executed by a processor, causes the processor to implement the control method provided in the present disclosure can be implemented.

BRIEF DESCRIPTION OF DRAWINGS

The accompanying drawings are provided to provide a further understanding of the present disclosure and constitute a part of the specification and, together with the following embodiments, serve to explain the present disclosure, but are not intended to limit the present disclosure. In the accompanying drawings.

DETAILED DESCRIPTION

Embodiments of the present invention are described in detail below with reference to the accompanying drawings. It should be understood that the embodiments set forth herein are merely intended to illustrate and explain the present invention and are not intended to limit the present invention.

In some cases in the art, for a bidirectional DC converter operating in a Buck/Boost mode, there are two main control methods, i.e., a control method for single carrier double modulation wave and a control method for single carrier single modulation wave. In the control method for single carrier double modulation wave, two modulation waves respectively control on/off of a switch transistor in a left second bridge arm. An existing problem lies in that a duty cycle of a drive signal of the switch transistor is infinitely close to 1 or infinitely close to 0. When the duty cycle is infinitely close to 1 or infinitely close to 0, a problem of voltage offset may occur. If the single carrier double modulation wave is used in a Buck mode and a Boost mode and then is switched to the single carrier single modulation wave after entering a Buck/Boost mode, the duty cycle of the drive signal of the switch transistor may change suddenly, which may lead to a problem that an inductive current may change suddenly and an output voltage index may get worse.

On this account, in an aspect of the present disclosure, a control method for a bidirectional DC converter is provided.

Figure 2:
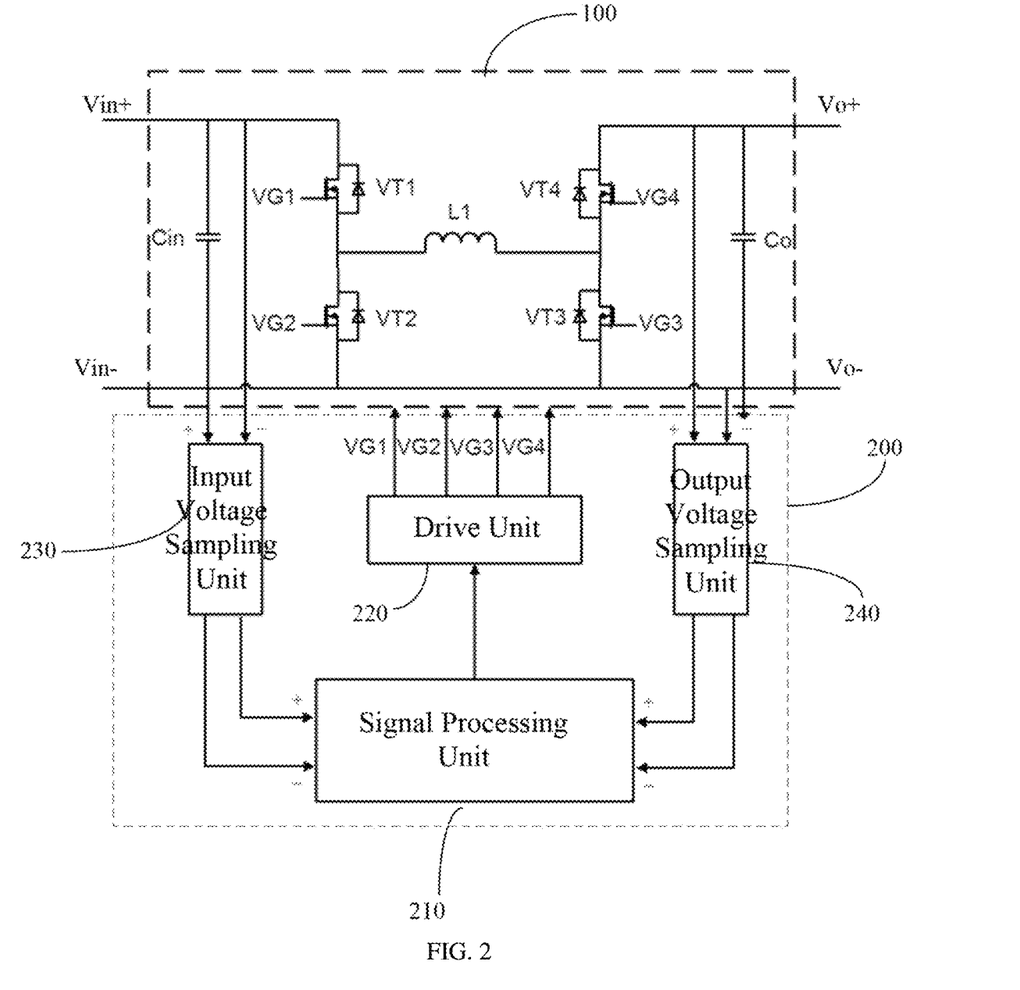
FIG. 2 is a schematic structural diagram of a bidirectional DC converter according to an embodiment of the present disclosure.
Figure 3:
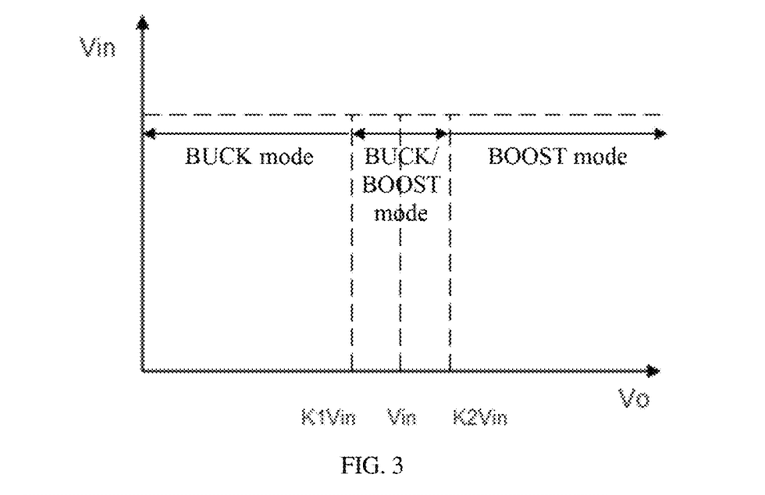
FIG. 3 is a schematic diagram showing an operating range of three operating modes of the bidirectional DC converter according to the present disclosure.

As shown in FIG. 2, in the present disclosure, the bidirectional DC converter includes at least one power conversion unit 100, which includes a first bridge arm, a second bridge arm, and an inductor L1. The first bridge arm includes a first switch transistor VT1 and a second switch transistor VT2, where a first electrode of the first switch transistor VT1 is electrically connected to a positive electrode Vin$^+$ of an input terminal of the bidirectional DC converter, a second electrode of the first switch transistor VT1 is electrically connected to a first electrode of the second switch transistor VT2, and a second electrode of the second switch transistor VT2 is electrically connected to a negative electrode Vin$^-$ of the input terminal of the bidirectional DC converter.

The second bridge arm includes a third switch transistor VT3 and a fourth switch transistor VT4, where a first electrode of the third switch transistor VT3 is electrically connected to a negative electrode Vo$^-$ of an output terminal of the bidirectional DC converter, a second electrode of the third switch transistor VT3 is electrically connected to a first electrode of the fourth switch transistor VT4, and a second electrode of the fourth switch transistor VT4 is electrically connected to a positive electrode Vo$^+$ of the output terminal of the bidirectional DC converter.

A first terminal of the inductor L1 is electrically connected to the second electrode of the first switch transistor VT1, and a second terminal of the inductor L1 is electrically connected to the first electrode of the fourth switch transistor VT4.

Figure 4:
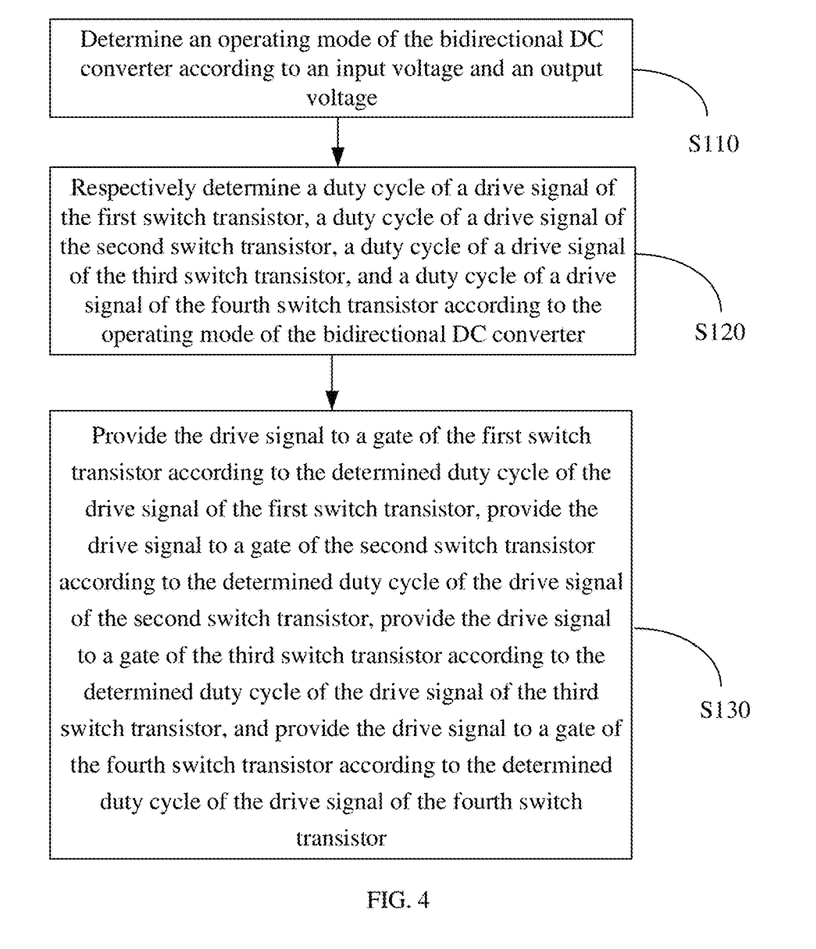
FIG. 4 is a flowchart of a control method according to an embodiment in an aspect of the present disclosure.

As shown in FIG. 4, the control method includes following steps S110 to S130.

At S110, an operating mode of the bidirectional DC converter is determined according to an input voltage and an output voltage.

At S120, a duty cycle of a drive signal of the first switch transistor, a duty cycle of a drive signal of the second switch transistor, a duty cycle of a drive signal of the third switch transistor, and a duty cycle of a drive signal of the fourth switch transistor are respectively determined according to the operating mode of the bidirectional DC converter.

At S130, the drive signal is provided to a gate of the first switch transistor according to the determined duty cycle of the drive signal of the first switch transistor, the drive signal is provided to a gate of the second switch transistor according to the determined duty cycle of the drive signal of the second switch transistor, the drive signal is provided to a gate of the third switch transistor according to the determined duty cycle of the drive signal of the third switch transistor, and the drive signal is provided to a gate of the fourth switch transistor according to the determined duty cycle of the drive signal of the fourth switch transistor.

The duty cycle of the drive signal of the first switch transistor, the duty cycle of the drive signal of the second switch transistor, the duty cycle of the drive signal of the third switch transistor, and the duty cycle of the drive signal of the fourth switch transistor between the operating mode of the bidirectional DC converter satisfy a following relationship:

in response to the bidirectional DC converter operating in a Buck mode, a maximum value of the duty cycle of the drive signal of the first switch transistor is a first duty cycle threshold;

in response to the bidirectional DC converter operating in a Boost mode, a minimum value of the duty cycle of the drive signal of the third switch transistor is a second duty cycle threshold; and in response to the bidirectional DC converter operating in a Buck/Boost mode, the duty cycle of the drive signal of the first switch transistor is a constant value, and the duty cycle of the drive signal of the third switch transistor is adjusted to implement output of the bidirectional DC converter in the Buck/Boost mode, where a differential between the first duty cycle threshold and the constant value does not exceed a predetermined differential A. Furthermore, the duty cycle of the drive signal of the third switch transistor satisfies:

$$1-D_{11}/K1 < D_{2<1} - D_{11}/K2, \text{ where:}$$

$D_{11}$ represents the constant value;

K1 represents a Buck coefficient of the bidirectional DC converter, $0.9 \leq K1 < 1$; and K2 represents a Boost coefficient of the bidirectional DC converter, $1 < K2 < 1.1$.

Switch transistors of different bidirectional DC converters have different switching frequency settings, and types of the switch transistors and parameters of drive circuits for generating various drive signals are different from each other. The drive signal of each switch transistor needs to satisfy a minimum duty cycle. Otherwise, due to adverse effects of some factors such as delay of the drive circuit that produces the drive signal and parasitic capacitance, the duty cycle of the drive signal finally provided to the switch transistor may be reduced, which may cause failure of the switch transistor to be completely turned on. For each DC converter, values of the Buck coefficient K1 and the Boost coefficient K2 are fixed, to meet requirements for normal operation of the DC converter.

In the control method provided by the present disclosure, when the bidirectional DC converter operates in the Buck mode, a relationship between an output voltage Vo and an input voltage Vin is as follows:

$$Vo = D_1 \times Vin.$$

$D_1$ represents the duty cycle of a drive signal VG1 provided to a gate of a first switch transistor VT1. In the Buck mode, as the output voltage Vo rises, the duty cycle of the drive signal VG1 provided to the gate of the first switch transistor VT1 also rises, and as described above, the duty cycle $D_1$ has a maximum value (i.e., the first duty cycle threshold, denoted by $D_{1max}$) in the Buck mode.

K1 represents the Buck coefficient, and when the bidirectional DC converter operates in the Buck mode, the following relation is also satisfied between the output voltage Vo and the input voltage Vin:

$$Vo \leq K1 \times Vin.$$

When the operating mode of the bidirectional DC converter is switched from the Buck mode to the Buck/Boost mode, because the duty cycle $D_1$ of the drive signal VG1 provided to the gate of the first switch transistor VT1 is the constant value (denoted by $D_{11}$), the output voltage can be adjusted by adjusting the duty cycle $D_2$ of the control signal VG3 provided to the gate of the third switch transistor VT3. In the Buck/Boost mode, the relation between the input voltage Vin and the output voltage Vo is as below:

$$Vo = (D_{11} \times Vin)/(1-D_2).$$

When the bidirectional DC converter operates in the Buck/Boost mode, the following relation is also satisfied between the output voltage Vo and the input voltage Vin:

$$K1 \times Vin < Vo < K2 \times Vin.$$

As can be seen from the above inequation, when the bidirectional DC converter operates in the Buck/Boost mode, the output voltage Vo is close to the input voltage Vin.

The duty cycle $D_{11}$ of the drive signal VG1 of the first switch transistor VT1 remains unchanged after entering the Buck/Boost mode, so the output voltage may be adjusted by adjusting the duty cycle $D_2$ of the third switch transistor VG3 to meet the normal output of the bidirectional DC converter in the Buck/Boost mode.

After the DC converter enters the Buck/Boost mode, the duty cycle $D_{11}$ of the drive signal VG1 of the first switch transistor VT1 is kept close to the maximum duty cycle $D_{1max}$ of the drive signal VG1 of the first switch transistor VT1 in the Buck mode, to ensure that the duty cycle of the drive signal VG1 of the first switch transistor VT1 does not change greatly during the transition from the Buck mode to the Buck/Boost mode, and effective on/off of each switch transistor can be ensured. Because the drive signal of the first switch transistor VT1 and the drive signal of the second switch transistor VT2 are complementary, the duty cycle of the drive signal VG2 of the second switch transistor VT2 does not change greatly during switching from the Buck mode to the Buck/Boost mode.

When the bidirectional DC converter is in the Buck mode, the fourth switch transistor VT4 is kept in a normal on state, and a drive signal VG4 of the fourth switch transistor VT4 is kept in a high-level state at this moment. When the bidirectional DC converter enters the Buck/Boost mode, the drive signal VG4 of the fourth switch transistor VT4 starts to act at the same switching frequency as the first switch transistor VT1.

According to the relationship between the input voltage and the output voltage in the Buck/Boost mode, it may be obtained that the duty cycle of the drive signal VG3 of the third switch transistor VT3 satisfies the inequation "$1-D_{11}/K1 < D_{2<1} - D_{11}/K2$" described above. As can be seen, the duty cycle of the drive signal VG3 of the third switch transistor VT3 is slightly greater than 0, and it can be ensured that the third switch transistor VT3 can be effectively turned on. Thus, it is ensured that the duty cycle is slightly increased from 0 in the process when the bidirectional DC converter is switched from the Buck mode to the Buck/Boost mode, and no larger sudden change of the duty cycle may occur. Because the third switch transistor VT3 and the fourth switch transistor VT4 operate complementarily, in the process when the bidirectional DC converter is switched from the Buck mode to the Buck/Boost mode, the duty cycle of the drive signal VG4 of the fourth switch transistor VT4 is slightly reduced from 1, and no larger sudden change of the duty cycle may occur.

When the bidirectional DC converter operates in the Boost mode, the first switch transistor VT1 operates in the normal on state, the duty cycle of the drive signal VG1 of the first switch transistor VT1 is 1 at this moment; and the second switch transistor VT2 is in a normal off state, and the duty cycle of the drive signal VG2 of the second switch transistor VT2 is 0 at this moment. In the Boost mode, the relation between the input voltage and the output voltage is $Vo=Vin/(1-D_2)$. After the bidirectional DC converter enters the Boost mode, the duty cycle of the drive signal of the third switch transistor VT3 will gradually increase with the rise of the output voltage. When the bidirectional DC converter just enters the Boost mode, the duty cycle $D_2$ of the drive signal VG2 of the third switch transistor VT3 is slightly greater than 0, which ensures that the duty cycle of the drive signal VG3 of the third switch transistor VT3 does not change greatly when the bidirectional DC converter is switched from the Buck/Boost mode to the Boost mode, and the duty cycle of the drive signal of the fourth switch transistor VT4 does not change greatly.

Because the four-switch bidirectional DC converter can implement bidirectional flow of energy, no matter which port of the bidirectional DC converter serves as a power input terminal, smooth switching of different modes can be implemented by means of the control method provided by the present invention without adding hardware circuits or changing circuit structures.

A concrete value of Δ is not particularly limited in the present disclosure. In some examples, the predetermined differential satisfies the following relation:

$$0<\Delta \leq 0.05.$$

In some examples, the first duty cycle threshold may be 0.95, and the constant value may be 0.92.

When the bidirectional DC converter enters the Buck/Boost mode, the duty cycle of the drive signal VG1 of the first switch transistor VT1 is kept at 0.92, which is quite close to the maximum duty cycle (0.95) of the drive signal VG1 in the Buck mode. In this way, it may be ensured that the duty cycle of the drive signal of the first switch transistor VT1 may not change greatly after the operating mode of the bidirectional DC converter is switched from the Buck mode to the Buck/Boost mode. Because the drive signal of the first switch transistor VT1 and the drive signal of the second switch transistor VT2 operate complementarily, the duty cycle of the drive signal VG2 of the second switch transistor VT2 does not change greatly when it is switched from $1-D_{1max}=0.05$ in the Buck mode to $1-D_{11}=0.8$ in the Buck/Boost mode.

Figure 9:
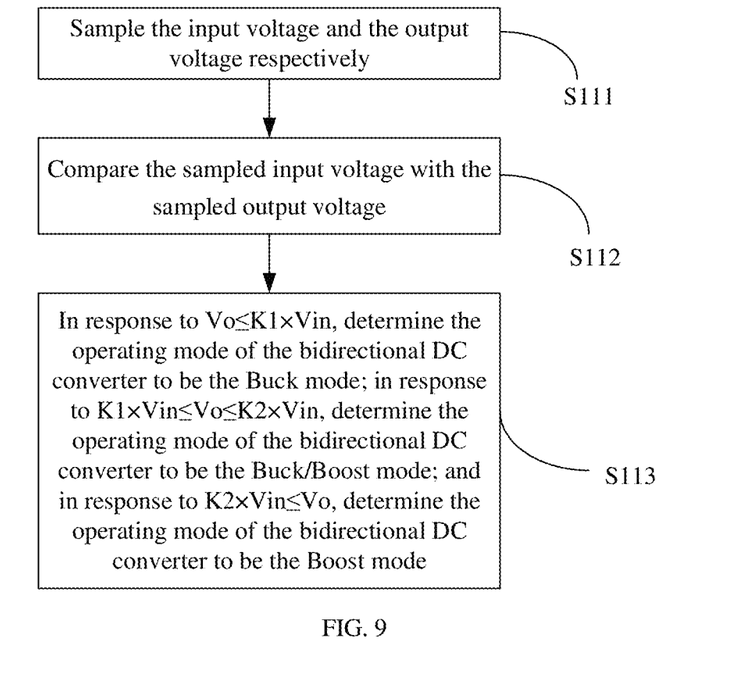
FIG. 9 is a schematic flowchart of step S110.

In the present disclosure, how to determine the bidirectional DC converter according to the input voltage and the output voltage in step S110 is not particularly limited. In some examples, as shown in FIG. 9, step S110 may include following steps S111 to S113.

At S111, the input voltage and the output voltage are sampled respectively.

At S112, the sampled input voltage is compared with the sampled output voltage.

At S113, when Vo≤K1×Vin, it is determined that the operating mode of the bidirectional DC converter is the Buck mode; when K1×Vin≤Vo≤K2×Vin, it is determined that the operating mode of the bidirectional DC converter is the Buck/Boost mode; and when K2×Vin≤Vo, it is determined that the operating mode of the bidirectional DC converter is the Boost mode.

To ensure that no frequent switching occurs during switching of various operating modes, hysteresis determination may be added at various switching points in some examples. In some embodiments, at S113:
in response to the operating mode of the bidirectional DC converter being switched from the Buck mode to the Buck/Boost mode, determining the operating mode of the bidirectional DC converter to be the Buck mode in response to Vo<K1'×Vin, wherein K1' represents a first hysteresis determination coefficient, and 0<K1'<K1; and
in response to the operating mode of the bidirectional DC converter being switched from the Boost mode to the Buck/Boost mode, determining the operating mode of the bidirectional DC converter to be the Buck/Boost mode in response to Vo<K2'×Vin, wherein K2' represents a second hysteresis determination coefficient, and 1<K2'<K2.

It should be pointed out that the first hysteresis determination coefficient K1' should be close to the Buck coefficient K1, and the differential between K1' and K1 does not exceed 0.05 in some examples. For example, when K1 is 0.95, K1' may be 0.92.

The second hysteresis determination coefficient K2' should be close to the Boost coefficient K2, and the differential between K2' and K2 does not exceed 0.05 in some examples. For example, when K2 is 1.05, K2' may be 1.02.

In some examples, the first duty cycle threshold $D_{1max}$ is equal to K1. For example, both K1 and $D_{1max}$ are 0.95.

In some examples, the second duty cycle threshold satisfies the following relation:

$$D_{2min}=1-1/K2;$$

where $D_{2min}$ represents the second duty cycle threshold.

In accordance with an aspect of the present disclosure, there is provided a control module 200 for a bidirectional DC converter. As shown in FIG. 2, the control module 200 includes a signal processing unit 210 and a drive unit 220.

The signal processing unit 210 is configured to determine an operating mode of the bidirectional DC converter according to an input voltage and an output voltage, and respectively determine a duty cycle of a drive signal VG1 of the first switch transistor VT1, a duty cycle of a drive signal VG2 of the second switch transistor VT2, a duty cycle of a drive signal VG3 of the third switch transistor VT3, and a duty cycle of a drive signal VG4 of the fourth switch transistor VT4 according to the operating mode of the bidirectional DC converter.

The duty cycle of the drive signal VG1 of the first switch transistor VT1, the duty cycle of the drive signal VG2 of the second switch transistor VT2, the duty cycle of the drive signal VG3 of the third switch transistor VT3, and the duty cycle of the drive signal VG4 of the fourth switch transistor VT4 satisfy a following relationship:
in response to the bidirectional DC converter operating in a Buck mode, a maximum value of the duty cycle of the drive signal VG1 of the first switch transistor VT1 is a first duty cycle threshold;
in response to the bidirectional DC converter operating in a Buck mode, a maximum value of the duty cycle of the drive signal of the first switch transistor is a first duty cycle threshold;
in response to the bidirectional DC converter operating in a Boost mode, a minimum value of the duty cycle of the drive signal of the third switch transistor is a second duty cycle threshold; and
in response to the bidirectional DC converter operating in a Buck/Boost mode, the duty cycle of the drive signal of the first switch transistor is a constant value, a differential between the first duty cycle threshold and the constant value does not exceed a predetermined differential, and the duty cycle of the drive signal of the third switch transistor satisfies:

$$1-D_{11}/K1<D_{2<1}-D_{11}/K2, \text{ where:}$$

$D_{11}$ represents the constant value;
K1 represents a Buck coefficient of the bidirectional DC converter, 0.9≤K1<1; and
K2 represents a Boost coefficient of the bidirectional DC converter, 1<K2<1.1.

The drive unit 220 has at least one output terminal group, and each output terminal group includes a first output terminal electrically connected to a gate of the first switch transistor VT1, a second output terminal electrically connected to a gate of the second switch transistor VT2, a third output terminal electrically connected to a gate of the third switch transistor VT3, and a fourth output terminal electrically connected to a gate of the fourth switch transistor VT4.

The drive unit 220 is configured to output the drive signal VG1 of the first switch transistor VT1 from the first output terminal according to the duty cycle of the drive signal VG1 of the first switch transistor VT1, output the drive signal VG2 of the second switch transistor VT2 from the second output terminal according to the duty cycle of the drive signal VG2 of the second switch transistor VT2, output the drive signal VG3 of the third switch transistor VT3 from the third output terminal according to the duty cycle of the drive signal VG3 of the third switch transistor VT3, and output the drive signal VG4 of the fourth switch transistor VT4 from the fourth output terminal according to the duty cycle of the drive signal VG4 of the fourth switch transistor VT4.

The control module 200 is configured to perform the above control method provided by the present disclosure. The principles and beneficial effects of the control method have been described in detail above, and thus their detailed descriptions are omitted herein.

To facilitate determining the operating mode of the bidirectional DC converter, in some examples, as shown in FIG. 2, the control module further includes:

an input voltage sampling unit 230 configured to collect the input voltage of the bidirectional DC converter; and an output voltage sampling unit 240 configured to collect the output voltage of the bidirectional DC converter.

In some examples, the predetermined differential satisfies the following relation:

$$0<\Delta\leq0.05,$$

where $\Delta$ represents the predetermined differential.

In response to Vo≤K1×Vin, the signal processing unit 210 determines the operating mode of the bidirectional DC converter to be the Buck mode.

In response to K1×Vin≤Vo≤K2×Vin, the signal processing unit 210 determines the operating mode of the bidirectional DC converter to be the Buck/Boost mode.

In response to K2×Vin≤Vo, the signal processing unit 210 determines the operating mode of the bidirectional DC converter to be the Boost mode.

In response to the operating mode of the bidirectional DC converter being switched from the Buck mode to the Buck/Boost mode, the signal processing unit 210 determines the operating mode of the bidirectional DC converter to be the Buck mode in response to Vo<K1'×Vin, where K1' represents a first hysteresis determination coefficient, and 0<K1'<K1.

In response to the operating mode of the bidirectional DC converter being switched from the Boost mode to the Buck/Boost mode, the signal processing unit 210 determines the operating mode of the bidirectional DC converter to be the Buck/Boost mode in response to Vo<K2'×Vin, where K2' represents a second hysteresis determination coefficient, and 1<K2'<K2.

The first duty cycle threshold is equal to K1, and the second duty cycle threshold satisfies the following relation:

$$D_{2min}=1-1/K2;$$

where $D_{2min}$ represents the second duty cycle threshold.

When the bidirectional DC converter operates in the Buck/Boost mode, the duty cycle of the drive signal of the third switch transistor satisfies the following formula:

Vo=($D_{11}$×Vin)/(1−$D_2$), wherein $D_2$ represents the duty cycle of the drive signal of the third switch transistor, and $D_{11}$ represents the constant value.

In accordance with an aspect of the present disclosure, there is provided a bidirectional DC converter. As shown in FIG. 2, the bidirectional DC converter includes at least one power conversion unit 100 and the aforementioned control module 200 provided by the present disclosure.

In some embodiments, the power conversion unit 100 includes a first bridge arm, a second bridge arm, and an inductor L1. The first bridge arm includes a first switch transistor VT1 and a second switch transistor VT2, where a first electrode of the first switch transistor VT1 is electrically connected to a positive electrode Vin⁺ of an input terminal of the bidirectional DC converter, a second electrode of the first switch transistor VT1 is electrically connected to a first electrode of the second switch transistor VT2, and a second electrode of the second switch transistor VT2 is electrically connected to a negative electrode Vin⁻ of the input terminal of the bidirectional DC converter.

The second bridge arm includes a third switch transistor VT3 and a fourth switch transistor VT4, where a first electrode of the third switch transistor VT3 is electrically connected to a negative electrode Vt⁻ of an output terminal of the bidirectional DC converter, a second electrode of the third switch transistor VT3 is electrically connected to a first electrode of the fourth switch transistor VT4, and a second electrode of the fourth switch transistor VT4 is electrically connected to a positive electrode V⁺ of the output terminal of the bidirectional DC converter.

A first terminal of the inductor L1 is electrically connected to the second electrode of the first switch transistor VT1, and a second terminal of the inductor L1 is electrically connected to the first electrode of the fourth switch transistor VT4.

In the present disclosure, number of the power output units 100 is not particularly limited. For example, in the implementation shown in FIG. 8, the bidirectional DC converter includes two power output units 100 connected in parallel.

In some examples, an input filter capacitor Cin may also be connected between the positive electrode of the input terminal and the negative electrode of the input terminal of the bidirectional DC converter, and an output filter capacitor Co may also be connected between the positive electrode of the output terminal and the negative electrode of the output terminal of the bidirectional DC converter.

Operating principles of the bidirectional DC converter provided in the present disclosure are described in detail below in connection with the embodiments.

Embodiment I

In this embodiment, the switching frequencies of both the first bridge arm and the second bridge arm are set to be 25 KHz. The Buck coefficient K1 is 0.95, and the Boost coefficient K2 is 1.05.

The input voltage sampling unit 230 samples an input voltage signal and then sends it to the signal processing unit 210. The output voltage sampling unit 240 samples an output voltage signal and then sends it to the signal processing unit 210. The signal processing unit 210 receives input/output voltage sampling signals and makes comparison and determination. When Vo≤K1×Vin, the system determines Vo<Vin, the power conversion unit 100 operates in the Buck mode, and the duty cycle of the switch transistor VT1 is set to $D_1$. In the Buck mode, Vo=$D_1$×Vin, the value of $D_1$ may increase with the rise of the output voltage Vo, and the duty cycle $D_1$ has the maximum value $D_{1max}$=0.95 in the Buck mode.

When the signal processing unit 210 detects 0.95×Vin<Vo<K2×Vin, the signal processing unit 210 determines that the output voltage is relatively close to the input voltage at this moment, and further it is determined that that power conversion unit 100 is in the Buck/Boost mode. In the Buck/Boost mode, the duty cycle of the drive signal VG1 of the first switch transistor VT1 is set to be constant at $D_{11}=0.92$, the duty cycle of the drive signal VG2 of the second switch transistor VT2 is set as $D_{22}$, and a relation expression between the input voltage, the output voltage and the duty cycle is Vo=(0.92×Vin)/(1−$D_{22}$) in the Buck/Boost mode. Because $D_{11}$ is kept unchanged in the Buck/Boost mode, the output voltage is adjusted by adjusting the duty cycle $D_2$ of the drive signal VG3 of the third switch transistor VT3, thus $0.032<D_{22}<0.124$ in the Buck/Boost mode, and on-time of the third switch transistor VT3 is 1.28 μS<T<4.96 μS.

In the Buck/Boost mode, the duty cycle of the drive signal VG1 of the first switch transistor VT1 is kept $D_{11}=0.92$, which is close to the maximum duty cycle $D_{1max}=0.95$ in the Buck mode. Thus, it may be ensured that the duty cycle of the drive signal VG1 of the first switch transistor VT1 does not change greatly during the transition from the Buck mode to the Buck/Boost mode. Because the drive signal VG1 of the first switch transistor VT1 and the drive signal VG2 of the second switch transistor VT2 operate complementarily, the duty cycle of the drive signal VG2 of the second switch transistor VT2 does not change greatly when it is switched from $1−D_{1max}=0.05$ in the Buck mode to $1−D_{11}=0.08$ in the Buck/Boost mode.

Figure 5:
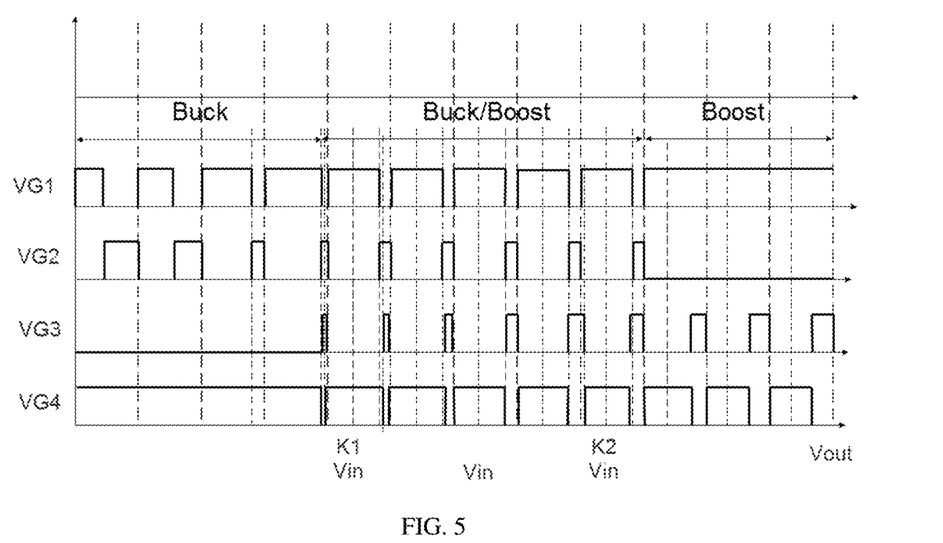
FIG. 5 is a drive waveform diagram showing switching of three modes in embodiment 1.

In the Buck mode, the third switch transistor VT3 is normally turned off, the duty cycle of the drive signal VG3 of the third switch transistor VT3 is $D_{2=0}$, the fourth switch transistor VT4 is kept in the normal on state, and the duty cycle of the drive signal VG4 of the fourth switch transistor VT4 is $1−D_{2=1}$. In the Buck/Boost mode, the drive signal VG4 of the fourth switch transistor VT4 starts to act at the same switching frequency as the first switch transistor VT1, and a high-level drive signal of the fourth switch transistor VT4 is centrosymmetrical with respect to a high-level signal of the first switch transistor VT1. A schematic waveform diagram of each drive signal in each mode is shown in FIG. 5.

In this embodiment, according to the relationship between the input voltage and the output voltage in the Buck/Boost mode, the duty cycle of the drive signal of the third switch transistor VT3 in this mode is $1−D_{11}/0.95<D_{22}<1−D_{11}/1.05$, where $D_{11}=0.92$, so the range of the duty cycle of the drive signal of the third switch transistor VT3 is $0.032<D_{22}<0.124$ in the Buck/Boost mode. Based on such setting, it is ensured that the duty cycle of the drive signal VG3 of the third switch transistor VT3 increases from 0 to the range of from 0.032 to 0.124 in the process of switching from the Buck mode to the Buck/Boost mode, and a larger abrupt change in the duty cycle will not occur. Because the drive signal of the third switch transistor VT3 and the drive signal of the fourth switch transistor VT4 operate complementarily, the duty cycle $(1−D_{22})$ of the drive signal VG4 of the fourth switch transistor VT4 is reduced from 1 to the range of from 0.968 to 0.876 in the process of switching from the Buck mode to the Buck/Boost mode, such that a larger abrupt change in the duty cycle of the drive signal VG4 will not occur.

When the signal processing unit 210 detects that 1.05×Vin≤Vo, the signal processing unit 210 determines that the output voltage is greater than the input voltage. At this moment, it is determined that the power output unit 100 operates in the Boost mode, and the first switch transistor VT1 is set to operate in the normal on state. At this moment, the duty cycle of the drive signal VG1 of the first switch transistor VT1 is 1, the second switch transistor VT2 is set to the normal off state, and the duty cycle of the drive signal VG2 of the second switch transistor VT2 is 0 at this moment. The relation between the input voltage and the output voltage in the Boost mode is Vo=Vin/(1−$D_{23}$). After entering the Boost mode, the duty cycle of the drive signal VG3 of the third switch transistor VT3 will gradually increase from $D_{23=1}−1/1.05=0.048$ with the rise of the output voltage. Therefore, when just entering the Boost mode, the duty cycle of the drive signal VG3 of the third switch transistor VT3 is $D_{23}=0.048$. In this way, the duty cycle of the drive signal VG3 changes from 0.124 to 0.048 when entering the Boost mode from the Buck/Boost mode, and no larger abrupt change in the duty cycle of the drive signal VG4 occurs when it is switched from the Buck/Boost mode to the Boost mode. Likewise, the duty cycle of the drive signal VG4 changes from 0.876 to 0.952 when switching from the Buck/Boost mode to the Boost mode, and no larger abrupt change in the duty cycle of the drive signal VG4 occurs.

Figure 6:
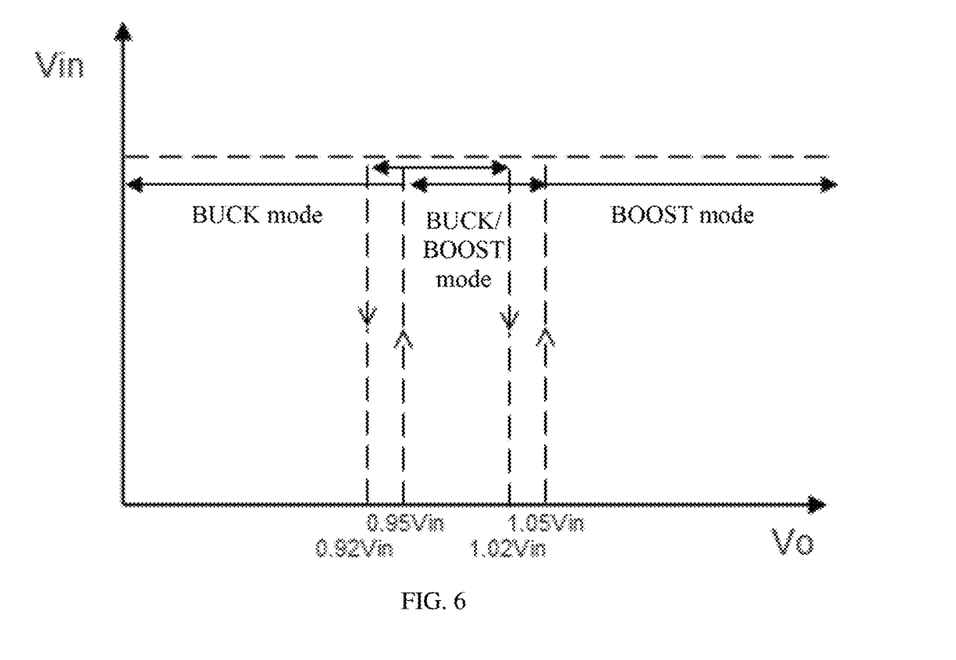
FIG. 6 is a division diagram showing hysteresis control intervals of switching of the three modes in embodiment 2.

As describe above in this embodiment, the input voltage is unchanged, and in the process of gradual rise of the output voltage, the duty cycle of each switch transistor is changed. When the input voltage remains unchanged, the process of the output voltage gradually dropping from a high voltage is a reverse process of the above process, where the change of the duty cycle of each switch transistor a reverse change, which is a smooth transition and no larger abrupt change occurs, and thus is not described in detail here. In addition, to ensure that there is no frequent switching of modes during switching of the modes, hysteresis determination may be added at each switching point. Hysteresis setting is shown in FIG. 6. In the figure, when the input voltage remains unchanged and the output voltage rises above 0.95 Vin, the circuit enters the Buck/Boost mode from the Buck mode, and the circuit does not enter the Buck mode from the Buck/Boost mode unless the output voltage is below 0.92 Vin. Similarly, when the output voltage rises above 1.05 Vin, the circuit enters the Boost mode from the Buck/Boost mode, and the circuit does not enter the Buck/Boost mode from the Boost mode unless the output voltage is below 1.02 Vin.

Embodiment II

Figure 7:
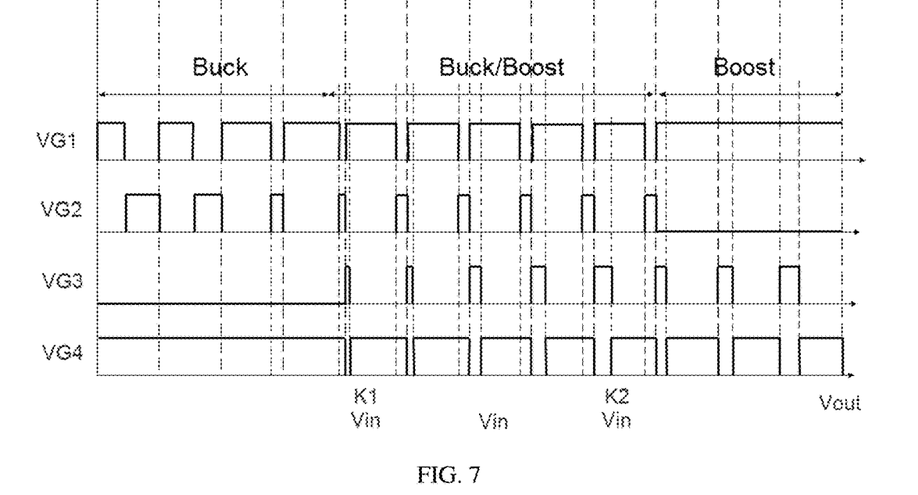
FIG. 7 is a drive waveform diagram showing switching of the three modes in embodiment 2.

Different from Embodiment 1, in this embodiment, a rising edge of the drive signal VG3 of the third switch transistor VT3 and a rising edge of the drive signal VG1 of the first switch transistor VT1 are generated at the same moment. A schematic waveform diagram of each drive signal in each mode in Embodiment 2 is shown in FIG. 7.

As can be seen, when the power output unit 100 is switched between different operating modes, the duty cycle of each drive signal does not change significantly.

Embodiment III

Different from Embodiment 1, the frequency of the drive signal adopted in this embodiment is 50 KHz, and the $D_{11}$ is set as $D_{11}=0.88$. In this embodiment, the range of the duty cycle of the drive signal VG3 of the third switch transistor VT3 in the Buck/Boost mode is:

$$1−D_{11}/0.95<D_{22}<1−D_{11}/1.05, i.e., 0.074<D_{22}<0.162.$$

The on-time of the third switch transistor VT3 in the Buck/Boost mode is 1.48 μS<T<3.24 μS.

Embodiment IV

Figure 8:
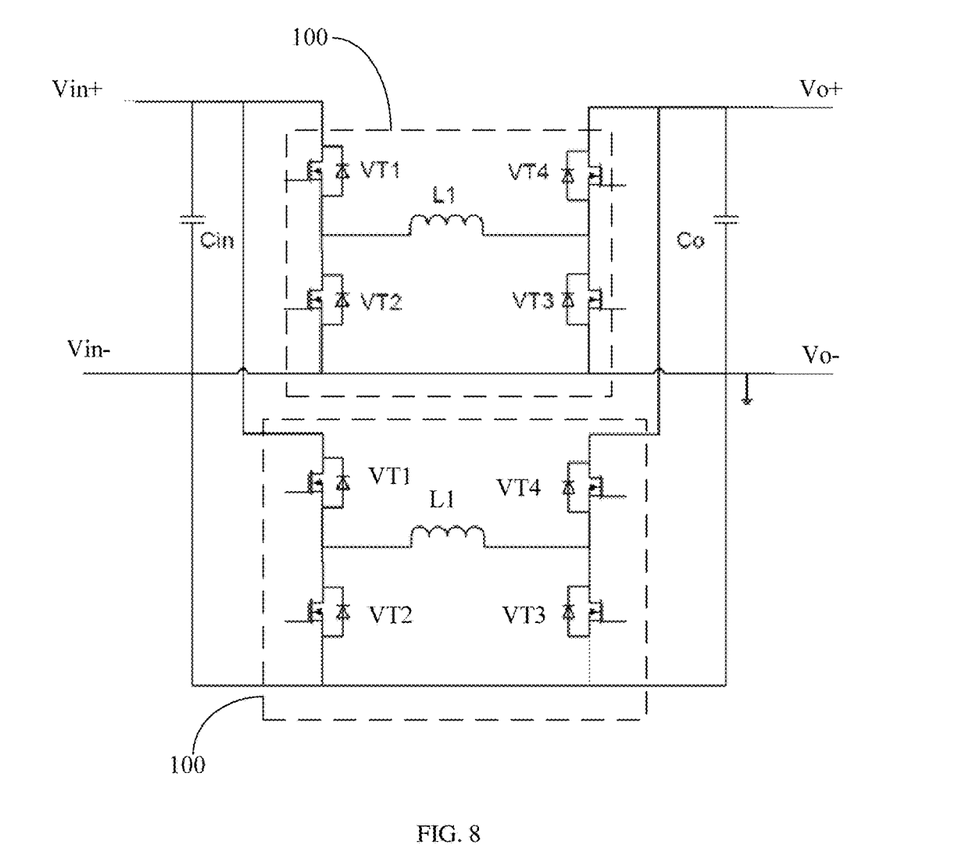
FIG. 8 is a circuit structure diagram of two power conversion units in embodiment 4.

Different from Embodiment 1, as shown in FIG. 8, the bidirectional DC converter in this embodiment includes two independent power output units 100, input terminals of the two power input units are connected in parallel, output terminals of the two power input units are connected in parallel, and a phase between the two power input units interleaves at an angle of 180 degrees.

In accordance with an aspect of the present disclosure, there is provided a non-transitory computer-readable storage medium having an executable program stored thereon. When the executable program is invoked, the control method provided in the present disclosure can be implemented.

When the control method provided by the present disclosure is used to control the bidirectional DC converter provided by the present disclosure, when the bidirectional DC converter is switched between operating modes, the duty cycle of the drive signal of each switch transistor can be avoided from changing to a larger extent, thereby avoiding the phenomenon of voltage offset.

Those of ordinary skill in the art may understand that functional modules/units in all or some steps, systems or apparatuses in the method disclosed above may be implemented by software, firmware, hardware or any suitable combination thereof. In a hardware implementation, the division between functional modules/units mentioned in the above description does not necessarily correspond to the division of physical components. For example, one physical component may have multiple functions, or one function or step may be jointly performed by a plurality of physical components. Some or all the physical components may be implemented as software executed by a processor such as a CPU, a digital signal processor or microprocessor, or may be implemented as hardware or an integrated circuit such as an application specific integrated circuit. Such software may be distributed on a computer-readable medium, which may include a computer storage medium (or non-transitory medium) and a communication medium (or a transitory medium). As well known to those of ordinary skill in the art, the term computer storage media include volatile and non-volatile, removable and non-removable media implemented in any method or technology for storage of information, such as computer-readable instructions, data structures, program modules, or other data. The computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer. Furthermore, as well known to those of ordinary skill in the art, communication media typically include computer-readable instructions, data structures, program modules or other data in a modulated data signal such as a carrier wave or other transport mechanism, and may include any information delivery media.

It is to be understood that the foregoing implementations are merely exemplary implementations to describe the principles of the present invention. However, the present invention is not limited thereto. To those of ordinary skill in the art, various modifications and improvements may be made without departing from the spirit and essence of the present invention, and these modifications and improvements are also deemed to be within the scope of protection of the present invention.

What is claimed is:

1. A control method for a bidirectional DC converter, the bidirectional DC converter comprising at least one power conversion unit, the power conversion unit comprising a first bridge arm, a second bridge arm and an inductor, the first bridge arm comprising a first switch transistor and a second switch transistor, a first electrode of the first switch transistor being electrically connected to a positive electrode of an input terminal of the bidirectional DC converter, a second electrode of the first switch transistor being electrically connected to a first electrode of the second switch transistor, a second electrode of the second switch transistor being electrically connected to a negative electrode of the input terminal of the bidirectional DC converter, the second bridge arm comprising a third switch transistor and a fourth switch transistor, a first electrode of the third switch transistor being electrically connected to a negative electrode of an output terminal of the bidirectional DC converter, a second electrode of the third switch transistor being electrically connected to a first electrode of the fourth switch transistor, a second electrode of the fourth switch transistor being electrically connected to a positive electrode of the output terminal of the bidirectional DC converter, a first terminal of the inductor being electrically connected to the second electrode of the first switch transistor, and a second terminal of the inductor being electrically connected to the first electrode of the fourth switch transistor; the control method comprising:

determining an operating mode of the bidirectional DC converter according to an input voltage and an output voltage;

respectively determining a duty cycle of a drive signal of the first switch transistor, a duty cycle of a drive signal of the second switch transistor, a duty cycle of a drive signal of the third switch transistor, and a duty cycle of a drive signal of the fourth switch transistor according to the operating mode of the bidirectional DC converter; and providing the drive signal to a gate of the first switch transistor according to the determined duty cycle of the drive signal of the first switch transistor, providing the drive signal to a gate of the second switch transistor according to the determined duty cycle of the drive signal of the second switch transistor, providing the drive signal to a gate of the third switch transistor according to the determined duty cycle of the drive signal of the third switch transistor, and providing the drive signal to a gate of the fourth switch transistor according to the determined duty cycle of the drive signal of the fourth switch transistor; wherein the duty cycle of the drive signal of the first switch transistor, the duty cycle of the drive signal of the second switch transistor, the duty cycle of the drive signal of the third switch transistor, and the duty cycle of the drive signal of the fourth switch transistor between the operating mode of the bidirectional DC converter satisfy a following relationship:

in response to the bidirectional DC converter operating in a Buck mode, a maximum value of the duty cycle of the drive signal of the first switch transistor is a first duty cycle threshold;

in response to the bidirectional DC converter operating in a Boost mode, a minimum value of the duty cycle of the drive signal of the third switch transistor is a second duty cycle threshold; and in response to the bidirectional DC converter operating in a Buck/Boost mode, the duty cycle of the drive signal of the first switch transistor is a constant value, a differential between the first duty cycle threshold and the constant value does not exceed a predetermined differential, and the duty cycle of the drive signal of the third switch transistor satisfies:

$1-D_{11}/K1 < D_2 < 1-D_{11}/K2$, where:

$D_{11}$ represents the constant value;
K1 represents a Buck coefficient of the bidirectional DC converter, $0.9 \le K1 < 1$; and
K2 represents a Boost coefficient of the bidirectional DC converter, $1 < K2 < 1.1$.

2. The control method of claim 1, wherein the predetermined differential satisfies a following relation:

$0 < \Delta \le 0.05$, wherein $\Delta$ represents the predetermined differential.

3. The control method of claim 1, wherein the determining an operating mode of the bidirectional DC converter according to an input voltage and an output voltage comprises:
sampling the input voltage and the output voltage respectively;
comparing the sampled input voltage with the sampled output voltage;
in response to $Vo \le K1 \times Vin$, determining the operating mode of the bidirectional DC converter to be the Buck mode;
in response to $K1 \times Vin \le Vo \le K2 \times Vin$, determining the operating mode of the bidirectional DC converter to be the Buck/Boost mode; and
in response to $K2 \times Vin \le Vo$, determining the operating mode of the bidirectional DC converter to be the Boost mode.

4. The control method of claim 3, wherein in the determining an operating mode of the bidirectional DC converter according to an input voltage and an output voltage,
in response to the operating mode of the bidirectional DC converter being switched from the Buck mode to the Buck/Boost mode, determining the operating mode of the bidirectional DC converter to be the Buck mode in response to $Vo < K1' \times Vin$, wherein K1' represents a first hysteresis determination coefficient, and $0 < K1' < K1$; and
in response to the operating mode of the bidirectional DC converter being switched from the Boost mode to the Buck/Boost mode, determining the operating mode of the bidirectional DC converter to be the Buck/Boost mode in response to $Vo < K2' \times Vin$, wherein K2' represents a second hysteresis determination coefficient, and $1 < K2' < K2$.

5. The control method according to claim 1, wherein the first duty cycle threshold is equal to K1, and the second duty cycle threshold satisfies a following relation:

$D_{2min} = 1 - 1/K2$;

wherein, $D_{2min}$ represents the second duty cycle threshold.

6. The control method according to claim 1, wherein in response to the bidirectional DC converter operating in the Buck/Boost mode, the duty cycle of the drive signal of the third switch transistor satisfies a following formula:
$Vo = (D_{11} \times Vin)/(1-D_2)$, wherein $D_2$ represents the duty cycle of the drive signal of the third switch transistor, and $D_{11}$ represents the constant value.

7. A control module for a bidirectional DC converter, the bidirectional DC converter comprising at least one power conversion unit, the power conversion unit comprising a first bridge arm, a second bridge arm and an inductor, the first bridge arm comprising a first switch transistor and a second switch transistor, a first electrode of the first switch transistor being electrically connected to a positive electrode of an input terminal of the bidirectional DC converter, a second electrode of the first switch transistor being electrically connected to a first electrode of the second switch transistor, a second electrode of the second switch transistor being electrically connected to a negative electrode of the input terminal of the bidirectional DC converter, the second bridge arm comprising a third switch transistor and a fourth switch transistor, a first electrode of the third switch transistor being electrically connected to a negative electrode of an output terminal of the bidirectional DC converter, a second electrode of the third switch transistor being electrically connected to a first electrode of the fourth switch transistor, a second electrode of the fourth switch transistor being electrically connected to a positive electrode of the output terminal of the bidirectional DC converter, a first terminal of the inductor being electrically connected to the second electrode of the first switch transistor, and a second terminal of the inductor being electrically connected to the first electrode of the fourth switch transistor;

the control module comprising:
a signal processing unit, configured to determine an operating mode of the bidirectional DC converter according to an input voltage and an output voltage, and respectively determine a duty cycle of a drive signal of the first switch transistor, a duty cycle of a drive signal of the second switch transistor, a duty cycle of a drive signal of the third switch transistor, and a duty cycle of a drive signal of the fourth switch transistor according to the operating mode of the bidirectional DC converter; wherein the duty cycle of the drive signal of the first switch transistor, the duty cycle of the drive signal of the second switch transistor, the duty cycle of the drive signal of the third switch transistor, and the duty cycle of the drive signal of the fourth switch transistor between the operating mode of the bidirectional DC converter satisfy a following relationship:
in response to the bidirectional DC converter operating in a Buck mode, a maximum value of the duty cycle of the drive signal of the first switch transistor is a first duty cycle threshold;
in response to the bidirectional DC converter operating in a Boost mode, a minimum value of the duty cycle of the drive signal of the third switch transistor is a second duty cycle threshold; and
in response to the bidirectional DC converter operating in a Buck/Boost mode, the duty cycle of the drive signal of the first switch transistor is a constant value, a differential between the first duty cycle threshold and the constant value does not exceed a predetermined differential, and the duty cycle of the drive signal of the third switch transistor satisfies:

$1-D_{11}/K1 < D_2 < 1-D_{11}/K2$, wherein:

$D_{11}$ represents the constant value;
K1 represents a Buck coefficient of the bidirectional DC converter, $0.9 \le K1 < 1$; and
K2 represents a Boost coefficient of the bidirectional DC converter, $1 < K2 < 1.1$; and
a drive unit having at least one output terminal group, each output terminal group comprising a first output terminal electrically connected to a gate of the first switch transistor, a second output terminal electrically connected to a gate of the second switch transistor, a third output terminal electrically connected to a gate of the third switch transistor, and a fourth output terminal electrically connected to a gate of the fourth switch transistor, wherein the drive unit is configured to output the drive signal of the first switch transistor from the first output terminal according to the duty cycle of the drive signal of the first switch transistor, output the drive signal of the second switch transistor from the second output terminal according to the duty cycle of the drive signal of the second switch transistor, output the drive signal of the third switch transistor from the third output terminal according to the duty cycle of the drive signal of the third switch transistor, and output the drive signal of the fourth switch transistor from the fourth output terminal according to the duty cycle of the drive signal of the fourth switch transistor.

8. The control module of claim 7, wherein the bidirectional DC converter further comprises:
an input voltage sampling unit configured to collect the input voltage of the bidirectional DC converter; and
an output voltage sampling unit configured to collect the output voltage of the bidirectional DC converter.

9. The control module of claim 7, wherein the predetermined differential satisfies a following relation:

$0 < \Delta \leq 0.05$, wherein $\Delta$ represents the predetermined differential.

10. The control module of claim 7, wherein:
in response to $Vo \leq K1 \times Vin$, the signal processing unit determines the operating mode of the bidirectional DC converter to be the Buck mode;
in response to $K1 \times Vin \leq Vo \leq K2 \times Vin$, the signal processing unit determines the operating mode of the bidirectional DC converter to be the Buck/Boost mode; and
in response to $K2 \times Vin \leq Vo$, the signal processing unit determines the operating mode of the bidirectional DC converter to be the Boost mode.

11. The control module of claim 10, wherein:
in response to the operating mode of the bidirectional DC converter being switched from the Buck mode to the Buck/Boost mode, the signal processing unit determines the operating mode of the bidirectional DC converter to be the Buck mode in response to $Vo < K1' \times Vin$, wherein K1' represents a first hysteresis determination coefficient, and $0 < K1' < K1$; and
in response to the operating mode of the bidirectional DC converter being switched from the Boost mode to the Buck/Boost mode, the signal processing unit determines the operating mode of the bidirectional DC converter to be the Buck/Boost mode in response to $Vo < K2' \times Vin$, wherein K2' represents a second hysteresis determination coefficient, and $1 < K2' < K2$.

12. The control module according to claim 7, wherein the first duty cycle threshold is equal to K1, and the second duty cycle threshold satisfies a following relation:

$D_{2min} = 1 - 1/K2$;

wherein, $D_{2min}$ represents the second duty cycle threshold.

13. The control module according to claim 7, wherein in response to the bidirectional DC converter operating in the Buck/Boost mode, the duty cycle of the drive signal of the third switch transistor satisfies a following formula:
$Vo = (D_{11} \times Vin)/(1-D_2)$, wherein $D_2$ represents the duty cycle of the drive signal of the third switch transistor, and $D_{11}$ represents the constant value.

14. A bidirectional DC converter comprising:
at least one power conversion unit, the power conversion unit comprising a first bridge arm, a second bridge arm and an inductor, the first bridge arm comprising a first switch transistor and a second switch transistor, a first electrode of the first switch transistor being electrically connected to a positive electrode of an input terminal of the bidirectional DC converter, a second electrode of the first switch transistor being electrically connected to a first electrode of the second switch transistor, a second electrode of the second switch transistor being electrically connected to a negative electrode of the input terminal of the bidirectional DC converter, the second bridge arm comprising a third switch transistor and a fourth switch transistor, a first electrode of the third switch transistor being electrically connected to the negative electrode of the output terminal of the bidirectional DC converter, a second electrode of the third switch transistor being electrically connected to a first electrode of the fourth switch transistor, a second electrode of the fourth switch transistor being electrically connected to the positive electrode of the output terminal of the bidirectional DC converter, a first terminal of the inductor being electrically connected to the second electrode of the first switch transistor, and a second terminal of the inductor being electrically connected to the first electrode of the fourth switch transistor; and
the control module according to claim 7.

15. A non-transitory computer-readable storage medium, storing an executable program which, when executed by a processor, causes the processor to perform the control method according to claim 1.

* * * * *